United States Patent Office 3,565,843
Patented Feb. 23, 1971

3,565,843
ORGANIC RUST INHIBITING COMPOSITION
Rudolph Kassinger, 408 Salter Place, Westfield, N.J. 07090, and Edward L. Kayle, 145 Grant Ave., Colonia, N.J. 07067
No Drawing. Filed Dec. 20, 1967, Ser. No. 691,965
Int. Cl. C08c 11/70
U.S. Cl. 260—28.5   14 Claims

ABSTRACT OF THE DISCLOSURE

A composition comprising (1) a gelled overbased alkaline earth metal sulfonate, (2) a coating material comprising a petroleum resin or a petroleum resin, wax, ethylene-vinyl acetate copolymer combination and (3) a hydrocarbon solvent when applied to metal surfaces imparts to such surfaces unusually high protection against rust.

BACKGROUND OF THE INVENTION

Field of the invention

This invention relates to organic compositions which are useful as rust inhibiting coatings on metal surfaces. More particularly, the invention relates to a rust inhibiting composition comprising an overbased alkaline earth metal sulfonate, a coating material of a polymer resin or a polymer resin, wax, copolymer combination, and a hydrocarbon solvent. Most particularly, this invention relates to rust inhibiting compositions in which the overbased alkaline earth metal sulfonate has been treated with an aqueous ammonia solution prior to its incorporation into the coating material and the hydrocarbon solvent.

Description of the prior art

For many years it has been the practice to spray the underside of an automobile with an asphalt based coating to prevent or reduce rusting. These "undercoating" compositions, however, display the objectionable features of being black in color and sticky or tacky to the touch. The use of these asphalt based "undercoatings" results in a visually messy coating operation and unsightly stains on the car finish, if slight overspraying occurs. It is, therefore, desirable that a rust preventive spray coating be developed which is essentially colorless and hard but yet exhibit rust preventive qualities at least as good as, if not better, than the art known asphalt based "undercoatings."

SUMMARY OF THE INVENTION

It has been found that a rust inhibiting composition comprising about 10 to 35 wt. percent, preferably 15 to 25 wt. percent of an aqueous ammonia gelled overbased alkaline earth metal sulfonate composition 1, about 5 to 15 wt. percent of a coating material selected from the group consisting of a polymer resin and a combination of a polymer resin, an ethylene-vinyl acetate copolymer and a wax, and about 55 to 85 wt. percent, preferably 65 to 80 wt. percent of a hydrocarbon solvent displays a unique combination of the properties of being essentially colorless in nature, almost tack free to the touch and several times more effective in preventing rust than the traditional asphalt based coatings.

The overbased metal sulfonates which form part of the composition of this invention are well known in the art as desirable rust inhibitors in lubricants and other oil compositions. Briefly, an overbased sulfonate is one containing excess metal over that required for complete neutralization of the sulfonic acid. Usually, overbasing is accomplished in situ in mineral lubricating oil by adding excess metal base, e.g., lime, to a sulfonate or sulfonic acid and then neutralizing the excess metal base with carbon dioxide. It is believed that the colloidal dispersion of the calcium carbonate that is thereby formed in the oil is stabilized by the sulfonate which forms a protective coating around the carbonate. This protective coating tends to prevent the undesirable agglomeration of the colloidal size carbonate crystals. Otherwise, this agglomeration could lead to precipitation of the carbonate, particularly when overbased sulfonates of high base number are being prepared. Frequently, in the over-basing of sulfonates, the excess metal base is added in the presence of a promoter which can be any of a wide number of compounds as disclosed; for example, in British Patent No. 782,058.

The overbased alkaline earth metal sulfonate is usually prepared by dispersing sulfonic acid or metal sulfonate or both in a hydrocarbon oil, e.g., a petroleum lubricating oil, adding a promoter to the dispersion, thereafter adding lime to the resulting mixture and then blowing a stream of carbon dioxide through the mixture of reactants. Conditions are maintained during the reaction so that a portion, but not all, the water formed by reaction of the metal base with carbon dioxide to give calcium carbonate is removed from the reaction mixture.

Sulfonic acids used in this invention are classified generally as either petroleum sulfonic acids or synthetic sulfonic acids. Petroleum sulfonic acids are produced by treating petroleum fractions, usually lubricating oil distillate fractions, the so-called white oil distillates or other petroleum fractions, e.g., petrolatum, with suitable sulfonating agents, including sulfur trioxide, concentrated sulfuric acid and fuming sulfuric acid. Synthetic sulfonic acids are prepared by treating relatively pure synthetic aromatic hydrocarbons in the same manner. The sulfonic acids as they form part of this invention are petroleum sulfonic acids or synthetic hydrocarbon sulfonic acids having molecular weights ranging between about 400 and about 1200, preferably in the range of about 400 to about 600.

The sulfonates that are overbased can be salts of any of the metals whose sulfonates have been used in the art, including those of sodium, lithium, potassium, iron, aluminum, zinc, manganese, cadmium, etc. Particularly applicable to the rust preventive compositons of this invention are the alkaline earth metal salts, including calcium, strontium and barium salts.

Generally the total base number of the overbased sulfonate should be greater than 200, preferably in the range of 225 to 320. The particular sulfonate which finds wide use in the rust preventive composition of this invention is an overbased calcium sulfonate having a total base number of at least 225.

Treating the overbased alkaline earth metal sulfonate with an aqueous ammonia solution prior to its combination with the other materials forming the rust inhibiting composition of this invention substantially increases the ability of the coating to protect metal surfaces from rusting. It is theorized that the ammonia treatment increases rust resistance by making the coating material more adherent to the surfaces to which it is applied. Just what physical or chemical change occurs when the sulfonate composition is treated with aqueous ammonia is not certain. It may be that the ammonia reacts with the sulfonate to form an ammoniated compound or the ammonia merely acts to enhance particle growth of the colloidal material in the sulfonate composition, thus forming a gelled composition. Observations of physical characteristics reveal only that treatment with aqueous ammonia transforms the overbased alkaline earth metal sulfonate from a colloidal solution to a gel.

Gelled overbased alkaline earth metal sulfonates are prepared by mixing 78 to 98, preferably 85 to 95 parts by weight of the overbased alkaline earth metal sulfonate with 2 to 22, preferably 5 to 15, parts by weight of aqueous ammonia at a temperature of approximately 130° F. to 190° F., preferably 140° F. to 185° F., until complete gellation occurs, generally in approximately 15 to 75 minutes. The sulfonate-aqueous ammonia mixture is preferably vigorously agitated until gellation becomes complete. The aqueous ammonia or ammonium hydroxide solution employed is commercially available concentrated NH$_4$OH having a molarity of about 14.8. The particular concentration of the aqueous ammonia is not critical, the only requirement being that it have sufficient strength to gel the overbased sulfonate. The resulting gelled product may be incorporated with the other components of this composition to form rust inhibiting compositions without any further treatment.

Another component of this rust inhibiting composition is a coating material selected from the group consisting of organic resinous materials or waxes or a combination thereof. As a general proposition, the organic resin of the present combination is a polymer resin, preferably a petroleum resin, having a molecular weight of about 800 to 2,000, preferably 1,000 to 1,200. Some physical properties of three such resins having commercial tradenames of "Piccopale 100, Piccolastic A–75" and "Piccolyte S–70" are given in Table I below.

able methods, such as addition of methyl alcohol and subsequent filtration, or by addition of dilute acid, water and/or caustic washing. The final solution is then stripped of unreacted hydrocarbons and low molecular weight oils by vacuum or steam distillation. The product is a substantially non-aromatic unsaturated hydrocarbon resin. A hydrocarbon mixture suitable for resin production is conveniently found in hydrocarbon streams obtained by steam cracking gas oils, heavy naphthas, or residua from petroleum. These cracked streams have wide boiling ranges between 20° and 170° C., or may be composed of any intermediate fraction selected from this range. The petroleum distillate resins synthesized by this method usually have softening points above 90° C.

The resin prepared in accordance with this process has a softening point of about 207° to 218° F., a molecular weight in the range of 1,000 to 1,200, and an iodine number (Wijs) of 100 to 140, preferably below 120.

Another coating material which may be combined with the gelled sulfonate and the hydrocarbon solvent of this invention is a wax-resin-copolymer material. Such material has been found to exhibit excellent results in protecting metal surfaces from oxidation. Basically, this material is a four component system containing: (1) from about 10 to 40 weight percent of a microcrystalline wax

TABLE I

| | Number | | |
|---|---|---|---|
| | 1 | 2 | 3 |
| Name | "Piccopale 100" resin | "Piccolastic A–75" polymer | "Piccolyte S–70" polymer |
| Type | Polymerized pet. monomers methylated paraffin chains | Styrene polymer | Terpene polymer pinenes, mainly beta pinene |
| Softening point, ° C., Ball and Ring (ASTM E-28-51T) | 100±3 | 75±3 | 70±3 |
| Molecular weight, approximate | 1,100 | | |
| Specific gravity, approximate | .970-.975 | | .99 |
| Density | | 1.06 | |
| Refractive | 1.5116 | 1.59 | |
| Acid No | <1 | <1 | <4 |
| Saponification No | <2 | <1 | <4 |
| Bromine No | 7.3 | | |
| Iodine value (Wijs) | 120 | <10 | |
| Viscosity (approximate), 180° C | | | 20.7 P |
| Flash point, ° F | 500 | | |
| Fire point, ° F | 500 | | |

Hydrocarbon resins to which the present invention is applicable are made by treating a hydrocarbon mixture containing diolefins, olefins, aromatics, paraffins, and naphthenes with 0.25 to 1.75% of an aluminum halide catalyst such as aluminum chloride and aluminum bromide. The catalysts may be used as solids or they may be employed as slurries in inert diluents or as hydrocarbon complexes such as are prepared by reacting aluminum chloride with raffinates stripped from resin polymerizates, for example, a naphtha containing about 60% olefins and 40% aromatics.

The polymerization feed should preferably be one from which the cyclodienes have been substantially removed. Typical hydrocarbon fractions useful for feeds in making these resins boil from 20° to 170° C. Analyses show the following composition:

Fraction, ° C.                                   Wt. percent

Distillation:
  70–70 _____ 0–60
  70–130 _____ 65–40
  30–170 _____ 35–0
Diolefins _____ 8–20
Aromatics _____ 19–49
Olefins _____ 60–30
Paraffins and naphthenes _____ 5–1

The polymerization reactions are conducted at temperatures in the range of −30° to +75° C. (preferably −10° to +60° C.). Residual catalyst is quenched by suitmelting in the range of from about 150° F. to 185° F., (2) from about 3 to 25 weight percent of an ethylene-vinyl acetate copolymer containing from about 15 to 35 weight percent of vinyl acetate having a density of from 0.935 to 0.960 g./cc. at 23° C. and a melt index of from about 1 to 30 g./10 min., (3) from about 3 to 25 weight percent of a polymer resin, preferably a petroleum resin; said ethylene-vinyl acetate copolymer and polymer resin being employed in equal proportions in the coating material, and (4) a refined paraffin wax having a melting point of from about 135° F. to 170° F., preferably about 145° F. to 160° F., which comprises the balance of the coating material.

The refined paraffin wax materials comprise normal paraffin and isoparaffin hydrocarbons derived from petroleum crude oils and having melting points within the range of from about 135° to 170° F., preferably between about 145° and 160° F. The paraffin waxes preferably predominate in normal paraffins and ordinarily are a mixture of homologus paraffins. These waxes are obtained by well-known dewaxing procedures from waxy lubricating oils, such as by solvent dewaxing with a methyl ethyl ketone-toluene mixture, methyl isobutyl ketone, propane, and the like. The precipitated wax crystals are removed by centrifuging or filtering to form a slack wax, and then are preferably further purified by recrystallization or washing to form a scale wax and refined wax. Preferably refined waxes contain less than 0.5% by weight of remaining oil. They are the refined crystalline paraffin waxes, well known in the art and in commerce.

The paraffin waxes are ordinarily present in amounts of at least 40% by weight of the essential four component composition, and preferably in amounts greater than 50% by weight thereof. The amount utilized however is predicated on the amount of the other three essential components, i.e., the amount of paraffin wax comprises the balance of the composition formulated. The properties of typical suitable paraffin waxes are shown in items A and B in Table II.

The microcrystalline waxes employed have higher molecular weights than crystalline paraffin waxes and have melting points of at least 150° F. and preferably from about 165° to 185° F. They may be obtained by conventional procedures from either heavy lubricating oil distillates or from residual wax-bearing fractions. Microcrystalline waxes are well known in the art of wax coating compositions and as articles of commerce. Typical properties of a microcrystalline wax are shown in items C and D in Table II.

TABLE II

|  | Refined paraffin wax | | Microcrystalline wax | |
| --- | --- | --- | --- | --- |
|  | (A) | (B) | (C) | (D) |
| Melting point, ASTM D87, °F. | 151 | 157 | | |
| Congealing point, ASTM D938, °F. | | | 169 | |
| Melting point, ASTM D127, °F. | | | 175 | 176. |
| Viscosity at 210° F., ASTM D445 cs. | 5.6 | 6.9 | 21.1 | 13.9. |
| Color [1] | 25 Say | 25 Say | 62 ASTM | 16 Say. |
| Instron test at 40° F.: | | | | |
| Tensile, p.s.i. | 383 | 311 | 298 | |
| Elongation, inches | 0.023 | 0.019 | 0.052 | |
| Elongation, percent | 2.9 | 2.4 | 6.5 | |
| Instron test at 73° F.: | | | | |
| Tensile, p.s.i. | 262 | 3.5 | | |
| Elongation, inches | 0.025 | 0.031 | | |
| Elongation, percent | 3.1 | 3.9 | | |

[1] Color is by either the ASTM D1500 method, or the Saybolt method.

The ethylene-vinyl acetate copolymers employed herein are obtained by heating a mixture of ethylene and vinyl acetate at a temperature ranging between about 100° and about 400° C. with or without the presence of a solvent as benzene or heptane under superatmospheric pressures of between about 100 and about 2,000 atmospheres. Generally, the reaction is expedited if an oxidation catalyst such as a peroxide or hydroperoxide, for example, benzoyl peroxide or tertiary butyl hydroperoxide, is also present. After reaction the resulting copolymer is separated from the unreacted monomers by flashing off the latter.

The mole ratio of ethylene to vinyl acetate is varied to affect density, the melt index, inherent viscosity, as well as the viscosity average molecular weight of the resultant copolymer. The melt index may range from about 1 to about 30 g./10 min., but it is preferred to employ an ethylene-vinyl acetate copolymer having a melt index ranging between about 2 and about 15 g./10 min. For best results, an ethylene to vinyl acetate mole ratio in the copolymer of between about 5:1 and about 15:1 is used (i.e., 40% vinyl acetate to 17% vinyl acetate, respectively) with the resultant copolymer having a melt index of about 2 to about 15. A particularly preferred copolymer is one containing about 28 weight percent of vinyl acetate (ethylene to vinyl acetate mole ratio of 8:1) and one preferably having a melt index of about 5. About 3 to 25% by weight of the ethylene vinyl acetate copolymer is incorporated into the wax composition, preferably 10 to 20%.

The following table illustrates typical ethylene-vinyl acetate copolymers which may be suitably employed in the present invention.

TABLE III.—ETHYLENE-VINYL ACETATE COPOLYMERS

| Ethylene-V/A copolymer | Melt index [1] | Percent vinyl acetate | Ethylene-V/A ratio, mole | Inherent viscosity at 30° C.[2] | Density, g./cc. at 23° C.[3] | Refractive index, $n_D^{25}$ |
| --- | --- | --- | --- | --- | --- | --- |
| A | 22-28 | 32-34 | 6.2/1 | 0.78 | 0.957 | 1.482 |
| B | 22-28 | 27-29 | 8/1 | 0.78 | 0.951 | 1.485 |
| C | 12-18 | 17-29 | 8/1 | 0.85 | 0.951 | 1.485 |
| D | 5-7 | 27-29 | 8/1 | 0.90 | 0.954 | 1.485 |
| E | 2.0-3.0 | 17-19 | 14.2/1 | 0.92 | 0.941 | 1.493 |
| F | 125-175 | 17-19 | | 0.54 | 0.937 | 1.492 |

[1] G./10 min. (ASTM D 1238, modified).
[2] 0.25 g./100 ml. toluene.
[3] ASTM D 1505.

The polymer resin portion of the wax-resin-copolymer coating material is the same type of resin as described previously. The preferred polymer resin is a petroleum resin.

The gelled sulfonate and the coating material are usually incorporated into a light hydrocarbon solvent which serves as a carrier. After the rust inhibiting composition coating is applied to the metal surface, the light hydrocarbon solvent evaporates, leaving an essentially clear untacky coating. As a general rule, the only requirements of this light hydrocarbon solvent is that it be relatively volatile and able to dissolve the other components of the coating. The solvent usually has a boiling point range of about 270° to 450° F., preferably 320° to 395° F. One preferred solvent is a hydrocarbon solvent sold under the trade name Varsol 2. This product has the following chemical and physical characteristics:

Varsol 2

| | |
| --- | --- |
| Specific Gravity | 0.808 |
| Initial boiling point | F. 326° |
| Drip point | F. 393° |
| Kauri-butanol value | 45 |
| Aniline point | 105 |
| Bromine No. | 0.1 |
| Flash Point (T.C.C.) | F. 114° |
| Wt. percent paraffins | 35 |
| Wt. percent naphthenes | 34 |
| Wt. percent other aromatics | 31 |

The rust inhibiting composition of this invention is generally prepared by a simple mixing process in which the components are combined to produce the finished product. The usual procedure is to blend the aqueous ammonia treated overbased alkaline earth metal sulfonate and coating material into the hydrocarbon solvent. This blending is done usually at temperatures of 70°–110° F. The gelled sulfonate is very viscous and does not easily disperse into the solvent, therefore, efficient mixing is important. Mixing usually continues until a uniform product is obtained. The resulting composition is then ready for application to metal surfaces.

DESCRIPTION OF THE PREFERRED EMBODIMENTS

This invention will be better understood when reference is made to the following examples which include the preferred embodiment of the invention. This example is, however, in no way to be construed as a limitation on the invention.

Example 1

A gelled overbased calcium petroleum sulfonate was prepared from a mixture containing 90% by weight of an overbased calcium petroleum sulfonate having a base number of approximately 290 derived from a sulfonic acid having a molecular weight of 450 and 10% by weight of commercial grade cocentrated $NH_4OH$. This mixture was heated gently with vigorous agitation to approximately 150° F. for approximately 30 minutes. The resulting product was a gell.

Example 2

A rust inhibiting composition was prepared by thoroughly mixing at approximately room temperature 22 parts by weight of the gell prepared according to Example 1 with 11 parts by weight of the petroleum resin Piccopale 100 described in Table I above and 67% by weight of the hydrocarbon solvent Varsol 2 described above. The resulting composition was smooth and uniform.

Example 3

A rust inhibiting composition was prepared by thoroughly mixing 16 parts by weight of the gelled overbased calcium petroleum sulfonate of Example 1; 8 parts by weight of a coating composition consisting of 15 wt. percent Piccopale 100, 15 wt. percent of an ethylene-vinyl acetate copolymer; said copolymer containing 28 wt. percent vinyl acetate having a melt index of about 2 g./10 min., 20 wt. percent of a microcrystalline wax having a melting point of about 175° F. and 50 wt. percent of a paraffin having a melting point of about 151° F.; said coating composition hereinafter referred to as coating material Y; and 76 parts by weight of hydrocarbon Varsol 2. The resulting composition was smooth and uniform.

The coatings of Examples 2 and 3 (designated as formulations II and III respectively) were compared with a formulation designated in Table IV below as formulation I containing the calcium petroleum sulfonate of Example 1 but in the ungelled form. Tests to determine the rust prevention ability of these components were carried out by spraying the composition in equal thicknesss on steel panels and subjecting these panels to rust promoting conditions.

TABLE IV

| | Formulation (wt. percent) | | |
| --- | --- | --- | --- |
| | I | II | III |
| Components: | | | |
| Varsol 2 | 67 | 67 | 76 |
| Piccopale 100 | 11 | 11 | |
| Overbased calcium petroleum sulfonate (ungelled) | 22 | | |
| Overbased calcium petroleum sulfonate (gelled) | | 22 | 16 |
| Coating composition Y | | | 8 |
| Properties: | | | |
| Humidity cabinet life (hours) | 48 | 250+ | 400+ |
| Salt spray cabinet life (hours) | ~425 | ~425 | |

In the humidity cabinet life test, steel panels (5 cm. x 10 cm. x .25 cm.) coated with each of the rust inhibiting formulations were exposed to an atmosphere of 100% relative humidity at 120° F. The panels are considered failures when 3 rust spots (each spot greater than 1 mm. in diameter) appear. From the data above it can be seen that the formulations using the gelled overbased calcium petroleum sulfonate were much superior in performance to that formulation using the ungelled sulfonate.

The salt spray cabinet life test is a more severe test for rust preventive coatings which consists of coating the steel panels as in the humidity cabinet life test above and exposing such panels to a salt (NaCl) fog in which the salt is present in the amount of 20% by weight at a temperature of 95° F. The panels are considered failures when 3 rust spots greater than 1 mm. each in diameter appear. Note here that the gelled products are much superior in inhibiting rust than the ungelled sulfonate compositions.

What is claimed is:
1. A rust inhibiting composition which comprises:
   (a) About 10 to 35 wt. percent of an aqueous ammonia gelled overbased alkaline earth metal petroleum or synthetic sulfonate;
   (b) About 5 to 15 wt. percent of a coating material selected from the group consisting of a hydrocarbon polymer resin and a combination of a hydrocarbon polymer resin, an ethylene-vinyl acetate copolymer having a melt index between about 1 and about 30 g./10 min. and a wax; and wherein said hydrocarbon polymer resin has a molecular weight in the range of about 800 to 2,000 and a softening point in the range of about 70± 3° C. to 100± 3° C., and
   (c) About 55 to 85 wt. percent of a hydrocarbon solvent having a boiling point range of about 270° to 450° F.

2. A rust inhibiting composition as in claim 1 wherein the gelled sulfonate has a total base number of at least 225 and a molecular weight range of from about 400 to 1,200.

3. A rust inhibiting composition as in claim 2 wherein the coating material is a hydrocarbon polymer resin.

4. A rust inhibiting composition as in claim 3 wherein the hydrocarbon polymer resin is a petroleum resin.

5. A rust inhibiting composition as in claim 4 wherein the resin has a softening point range of about 207° F. to 218° F. and a molecular weight range of about 1,000 to 1,200.

6. A rust inhibiting composition as in claim 5 wherein the gelled overbased alkaline earth metal sulfonate is gelled overbased calcium petroleum sulfonate.

7. A rust inhibiting composition as in claim 2 wherein the coating material is a combination of a hydrocarbon polymer resin, an ethylene-vinyl acetate copolymer and a wax.

8. A rust inhibiting composition as in claim 7 wherein the coating material is:
   (a) from about 10 to 40 wt. percent of a microcrystalline wax melting in the range of from about 150° F. to 185° F.;
   (b) from about 3 to 25 wt. percent of an ethylene-vinyl acetate copolymer containing from about 15 to 35 wt. percent of vinyl acetate having a density of from 0.935 to 0.960 g./cc. at 23° C. and a melt index of from about 2 to 15 g./10 min.;
   (c) from about 3 to 25 wt. percent of petroleum resin, said ethylene-vinyl acetate copolymer and petroleum resin being employed in equal proportions in the coating material; and
   (d) a refined paraffin wax having a melting point of from about 135° F. to 170° F. which comprises the balance of the coating material.

9. A rust inhibitor composition as in claim 8 wherein the hydrocarbon polymer resin is a petroleum resin.

10. A rust inhibiting composition as in claim 9 wherein the petroleum resin has a softening point range of about 207° F. to 215° F. and a molecular weight range of about 1,000 to 1,200.

11. A rust inhibiting composition as in claim 10 wherein the gelled overbased alkaline earth metal sulfonate is gelled overbased calcium sulfonate.

12. A rust inhibiting composition as in claim 1 wherein the hydrocarbon solvent has a boiling point range of about 200° to 400° F.

13. A process of producing a gelled overbased alkaline earth metal sulfonate which comprises:
   (a) mixing 78 to 98 parts by weight of an overbased alkaline metal sulfonate with 2 to 22 parts by weight of concentrated aqueous ammonia; and (b) heating the mixture of (a) at a temperature of from about 140° F. to 185° F. until complete gellation occurs.

14. A process as in claim 13 wherein the overbased alkaline earth metal sulfonate is a calcium sulfonate having a molecular weight range of about 400 to 1,200.

References Cited

UNITED STATES PATENTS

| | | | |
|---|---|---|---|
| 3,080,330 | 8/1963 | Rudel et al. | 260—18 |
| 3,161,610 | 12/1964 | Weisgerber et al. | 260—28.5 |
| 3,197,426 | 7/1965 | Zaayenga | 260—28.5 |
| 3,441,419 | 4/1969 | Atterby | 106—14 |

FOREIGN PATENTS

| | | | |
|---|---|---|---|
| 622,389 | 3/1963 | Belgium | 260—28.5AV |

ALLAN LIEBERMAN, Primary Examiner

T. MORRIS, Assistant Examiner

U.S. Cl. X.R.

106—14

PO-1050
(5/69)

UNITED STATES PATENT OFFICE
CERTIFICATE OF CORRECTION

Patent No. 3,565,843          Dated February 23, 1971

Inventor(s) Rudolph Kassinger et al

It is certified that error appears in the above-identified patent and that said Letters Patent are hereby corrected as shown below:

In column 1, line 5, after "07067" insert --, assignors to Esso Research and Engineering Company, a corporation of Delaware.--.

In column 8, line 73, after "alkaline" insert --earth--.

Signed and sealed this 17th day of August 1971.

(SEAL)
Attest:

EDWARD M. FLETCHER, JR.          WILLIAM E. SCHUYLER, J.
Attesting Officer          Commissioner of Patent